United States Patent [19]

Raque et al.

[11] Patent Number: 5,088,912
[45] Date of Patent: Feb. 18, 1992

[54] DOUGH PROCESSING AND CONVEYOR SYSTEM

[75] Inventors: Glen F. Raque; Edward A. Robinson; Jesse McLeod; Sherley W. Sample, all of Louisville, Ky.

[73] Assignee: Raque Food Systems, Inc., Louisville, Ky.

[21] Appl. No.: 532,052

[22] Filed: Jun. 1, 1990

[51] Int. Cl.⁵ .................. B29C 31/00; B29C 43/02; A21C 11/00
[52] U.S. Cl. .................. 425/155; 198/431; 198/418.6; 425/161; 425/162; 425/165; 425/167; 425/183; 425/186; 425/195; 425/335; 425/364 R; 425/436 R
[58] Field of Search ............ 425/155, 161, 162, 165, 425/166, 167, 364, 371, 372, 375, 383, 394, 397, 400, 403.1, 183, 186, 193, 335, 337, 340, 341, 346, 351, 436 R, 364 R, 135, 139, 145, 150, 157, 332, 335; 99/493 R, 443 C; 198/532, 431, 418.6, 594

[56] References Cited

U.S. PATENT DOCUMENTS

| 3,106,280 | 10/1983 | Baker | 198/431 |
| 3,324,987 | 6/1967 | Kiesser | 198/431 |
| 3,556,280 | 1/1971 | Schnee | 198/431 |
| 4,125,246 | 11/1978 | von Holdt | 425/441 |
| 4,155,441 | 5/1979 | Albrecht et al. | 198/431 |
| 4,155,698 | 5/1979 | Aichinger | 425/556 |
| 4,578,027 | 3/1986 | Koppa et al. | 425/364 R |
| 4,684,008 | 8/1987 | Hayashi et al. | 198/431 |
| 4,755,128 | 7/1988 | Alexander | 425/444 |

FOREIGN PATENT DOCUMENTS

| 672634 | 11/1965 | Belgium | 198/431 |
| 0212023 | 3/1987 | European Pat. Off. | 198/431 |
| 283113 | 5/1969 | U.S.S.R. | 198/431 |
| 1224183 | 3/1971 | United Kingdom | 198/431 |

Primary Examiner—Willard E. Hoag
Attorney, Agent, or Firm—Barnes & Thornburg

[57] ABSTRACT

Apparatus for "forming" (reshaping) plural dough balls on a conveyor including means for arranging the balls in a desired order on the conveyor. Included is a transfer conveyor with reciprocative end portion and funnel type means cooperating with ring means above a second conveyor for facilitating arranging the balls on the second conveyor and controls for the apparatus.

35 Claims, 7 Drawing Sheets

DOUGH PROCESSING AND CONVEYOR SYSTEM

BACKGROUND AND SUMMARY OF THE INVENTION

The present invention relates to a device for processing food items. More particularly, the Present invention relates to a dough processing and conveyor system for forming pressed pie crusts or dough discs from a dough ball and transporting the formed dough discs onto an output conveyor.

Boboli pizza pies have been popular in Europe for some time. Dough used to make Boboli pie crusts includes yeast so that the crust rises when cooked. Recently, the popularity of Boboli pizza pies in the U.S. has increased.

Dough balls used to form the Boboli pie crusts are conventionally formed by hand into flattened dough discs. The dough discs are then loaded onto a convey or which transports the dough discs through an oven to cook the dough discs or through a topping machine to spread various toppings on the discs. Forming pie crusts by hand makes mass production of the pie crusts expensive and time consuming.

One object of the present invention is to provide an automated system for rapidly forming dough balls into predetermined shapes.

Another object of the present invention is to provide a processing system which is capable of efficiently processing dough balls having different sizes.

Yet another object of the present invention is to provide means for transporting articles from an intermittently moving conveyor to a continuously moving conveyor without damaging the articles.

According to the present invention, a dough processing system is provided for forming dough balls. The processing system includes means for simultaneously forming at least two dough balls aligned in a predetermined pattern into predetermined shapes. The system also includes an intermittently moving forming conveyor including an input region for receiving dough balls aligned in the predetermined pattern. The input region of the forming conveyor transports the dough balls to a predetermined position below the forming means. The forming conveyor also includes an output region for transporting formed dough balls away from the forming means. A continuously moving delivery conveyor is provided including an input end situated above the input region of the forming conveyor for supplying a continuous stream of dough balls to the input region of the forming conveyor. Alignment means is located between the delivery conveyor and the forming conveyor for positioning the dough balls received from the output nd of the delivery conveyor in the predetermined pattern on the forming conveyor.

The processing system further includes a continuously moving output conveyor and transferring means for interconnecting the output region of the forming conveyor and the continuously moving output conveyor for transferring formed dough balls from the intermittently moving forming conveyor to the continuously moving output conveyor without damaging the formed dough balls. The forming conveyor includes a normally stationary forming conveyor belt and first drive means for intermittently moving the forming conveyor belt at a first predetermined speed. The output conveyor includes an output conveyor belt and second drive means for continuously moving the output conveyor at a second predetermined speed slower than the first predetermined speed.

According to one aspect of the present invention, the transferring means includes a transfer conveyor having a first end situated in close proximity to the output region of the forming conveyor for receiving articles from the forming conveyor and a second end situated in close proximity to the output conveyor for delivering articles to the output conveyor. The transferring means also includes third drive means for moving the transfer conveyor in a predetermined direction to transfer articles from the forming conveyor to the output conveyor. First control means is provided for coupling the third drive means to the first drive means only when the forming conveyor is moving so that the transfer conveyor moves at the first predetermined speed during movement of the forming conveyor to transfer articles from the forming conveyor to the transfer conveyor. Second control means is also provided for coupling the third drive means to the second drive means only when the forming conveyor is stationary so that the transfer conveyor moves at the second predetermined speed to transfer articles from the transfer conveyor to the output conveyor.

The transferring means further includes a transfer carriage assembly having a head roll defining the second end of the transfer carriage. Carriage moving means is provided for moving the transfer carriage in a direction opposite to the predetermined direction of movement of the transfer conveyor. The carriage moving means changes the position of the second end of the transfer conveyor relative to the output conveyor during transfer of articles from the transfer conveyor to the output conveyor.

The transferring conveyor feature of the present invention advantageously transports the formed dough balls from the intermittently moving forming conveyor to the continuously moving output conveyor without damaging the formed dough balls. Because the forming conveyor and the output conveyor move at different speeds, formed dough balls would be damaged if the transfer conveyor was not provided. The transferring means matches the speed of the transfer conveyor to the speed of the forming conveyor during transfer of formed dough balls from the forming conveyor to the transfer conveyor. The transferring means matches the speed of the transfer conveyor to the speed of the output conveyor during transfer of formed dough balls from the transfer conveyor to the output conveyor. This feature advantageously permits the rapid transfer of the formed dough balls from the forming to the output conveyor without damaging the formed dough balls.

According to another aspect of the present invention, forming means is provided including a forming head assembly having a rotatable support member including three side portions and an axis of rotation. A first set of forming heads is coupled to a first side portion of the support member. The first set of forming heads is aligned in a predetermined pattern for forming dough balls on the forming conveyor into predetermined shapes. A second set of forming heads is coupled to a second side portion of the support member aligned in a predetermined pattern for forming dough balls situated on the forming conveyor into predetermined shapes. A third set of forming heads is coupled to a third side portion of the support member aligned in a predetermined pattern for forming dough balls situated on the forming conveyor into predetermined shapes.

Each forming head of the first, second, and third sets of forming heads include a release plate, a forming surface for forming a dough ball against the forming conveyor into a predetermined shape, and means for extending the release plate away from the forming surface. The forming area of the forming surfaces is different for each set of forming heads. A different set of forming heads is situated over the forming conveyor depending upon the size of the dough ball being processed. The extending means moves the release plate downwardly away from the forming surface upon upward movement of the forming head away from the forming conveyor so that the release plate engages the formed dough ball and forces the formed dough ball away from the forming surface. This feature advantageously prevents the formed dough ball from sticking to the forming surface.

The forming means further includes means for mounting the support member in the predetermined position above the forming conveyor to align a selected one set of the first, second, or third sets of forming heads over the forming conveyor. Means for moving the selected set of forming heads relative to the forming conveyor is provided to form the dough balls aligned in the predetermined pattern on the forming conveyor into predetermined shapes.

This forming head assembly feature advantageously permits the system to process dough balls having different sizes to produce formed dough balls having different diameters or shapes without the formed dough balls sticking to the forming heads. If an operator wishes to change the size of the dough balls being processed, the operator simply rotates the support member to align a new set of forming heads over the forming conveyor. Therefore, rapid production of formed dough balls from the dough balls having various sizes is facilitated.

According to yet another aspect of the invention, the delivery conveyor includes a carriage assembly having a head roll defining the output end of the delivery conveyor. The processing system includes means for moving the carriage assembly from an extended position to a retracted position to change the position of the output end of the delivery conveyor with respect to the forming conveyor to supply articles such as dough balls to the plurality of predetermined locations on the forming conveyor.

The alignment means includes a plurality of alignment funnels. Each alignment funnel has an input end for receiving articles falling from the output end of the delivery conveyor and an output end positioned over a predetermined location on the forming conveyor. Therefore, articles falling through the alignment funnels are automatically properly positioned on the forming conveyor in a predetermined pattern. This feature advantageously permits the delivery conveyor to supply a continuous stream of articles to the forming conveyor which are automatically aligned in the predetermined pattern so that the forming conveyor can transport the predetermined pattern of articles to the forming means. This feature advantageously facilitates mass production of the formed articles.

A centering mechanism can be provided for centering articles on the forming conveyor. Centering may be required for articles such as dough balls which have irregular shapes. Such irregularly shaped articles may settle about random points on the forming conveyor which are not precisely centered in the predetermined position. Therefore, the centering mechanism enables irregularly shaped articles to be properly aligned and centered on the forming conveyor for forming by the forming means.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
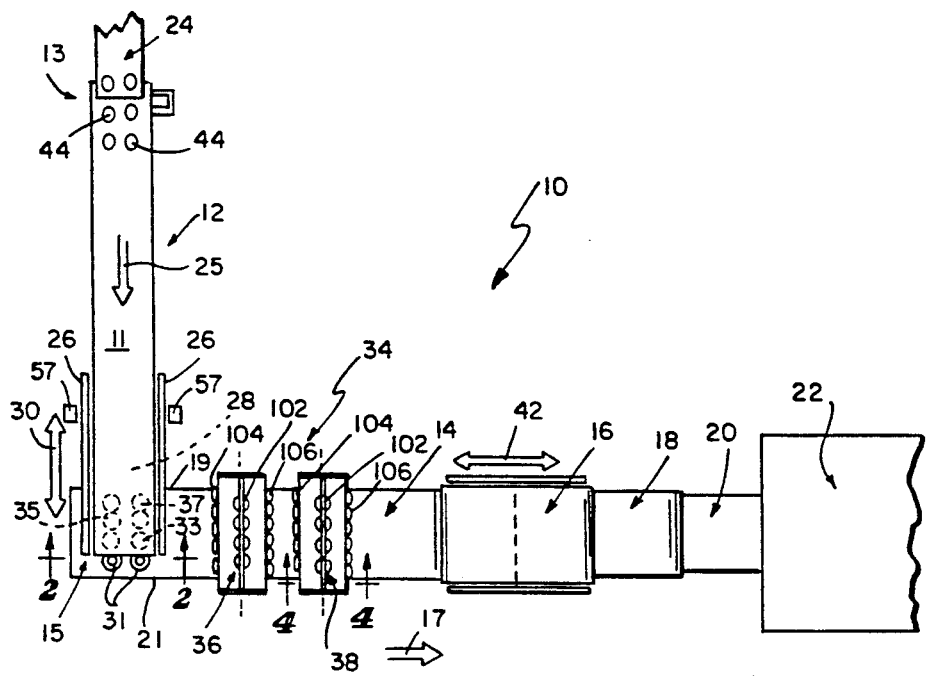
FIG. 1 is a diagrammatical plan view of a dough processing and conveyor system of the present invention including a delivery conveyor, a forming conveyor, two forming head assemblies, a transfer conveyor, and an output conveyor.

Referring now to the drawings, FIG. 1 illustrates a dough processing and conveyor system 10 of the present invention. The processing system 10 includes a delivery conveyor 12 for transporting a continuous stream of dough balls 44 from a first end 13 to a second end 15 of delivery conveyor 12 in the direction of arrow 25. Second end 15 of delivery conveyor 12 is positioned above a forming conveyor 14. The delivery conveyor 12 drops the dough balls 44 off the second end 15 through alignment funnels 31, 33, 35, and 37 to align the dough balls 44 in a predetermined pattern on forming conveyor 14.

Forming conveyor 14 intermittently moves in the direction of arrow 17 toward dough ball forming section 34. The dough balls 44 pass below forming section 34 on forming conveyor 14. The forming section 34 includes a first forming head assembly 36 and a second forming head assembly 38. The first and second forming head assemblies 36 and 38 each press dough balls 44 situated below a selected set of forming heads 102, 104, or 106 to form flattened dough discs 45 (see FIGS. 4 and 5). Each row of dough balls 44 is pressed once by each selected set of forming heads 102, 104, or 106 of forming head assemblies 36 and 38 to form dough discs 45 (see FIGS. 4 and 5).

Dough discs 45 are transported by forming conveyor 14 to transfer conveyor 16. Transfer conveyor 16 transfers the dough discs 45 from the intermittently moving forming conveyor 14 to a continuously moving output conveyor 18 without damaging the dough discs 45. Output conveyor 18 transfers the dough discs 45 to an input conveyor 20 of an oven or topping device 22. Output conveyor 18 and input conveyor 20 move at the same speed.

A continuous stream of spaced apart dough balls 44 enter the input end 13 of delivery conveyor 12 from an input conveyor 24 of a proofer oven (not shown). A pair of dough balls 44 enters delivery conveyor 12 at the same time. A trailing pair of dough balls 44 enters delivery conveyor 12 a predetermined distance behind a leading pair of dough balls 44. Delivery conveyor 12 transports the dough balls 44 in the direction of arrow 25 toward forming conveyor 14.

Delivery conveyor 12 includes a pair of guide rails 26 and a movable carriage 28. Carriage 28 is movable between an extended position and a retracted position in the directions indicated by double-headed arrow 30 to position the second end 15 of delivery conveyor 12 over a selected pair of alignment funnels 31, 33, 35, or 37 located between delivery conveyor 12 and forming conveyor 14.

Delivery conveyor 12 first drops a pair of dough balls 44 into a first pair of alignment funnels 31 located near second side 21 of forming conveyor 14. Carriage 28 is then retracted to align the second end 15 of delivery conveyor 12 with the next pair of alignment funnels 33. Carriage 28 remains in this position until another pair of dough balls 44 drops off the second end of delivery conveyor 12 through alignment funnels 33. Carriage 28 continues to intermittently retract to drop a pair of dough balls 44 through the remaining funnels 35 and 37. In its fully retracted position, carriage 28 positions the second end 15 of delivery conveyor 12 over the pair of alignment funnels 37 located near the first side 19 of forming conveyor 14. The forming conveyor 14 remains stationary while delivery conveyor 12 drops dough balls 44 through each pair of alignment funnels 31, 33, 35, and 37.

During one cycle of the processing system 10, the carriage 28 moves from the extended home position 51 to the retracted position 53 (see FIG. 3) to drop dough balls 44 in each pair of alignment funnels 31, 33, 35, and 37. As delivery conveyor 12 drops dough balls 44 on forming conveyor 14, the selected forming heads 102 on forming head assemblies 36 and 38 extend downwardly to press dough balls 44 located below the forming head assemblies 36 and 38 to form flattened dough discs 45 see FIG. 5). As the carriage 28 returns to the extended home position 51 near second side 21 of forming conveyor 14, the forming conveyor 14 moves in the direction of arrow 17 to position the next row of dough balls 44 below forming head assemblies 36 and 38. The forming conveyor 14 then stops. While forming conveyor 14 is stationary, the forming heads 102 of forming head assemblies 36 and 38 extend and retract to press the new row of dough balls 44 situated below forming head assemblies 36 and 38. The forming conveyor 14 then again moves a predetermined distance in the direction of arrow 17. The cycle is then complete.

After forming conveyor 14 stops at the end of the first cycle, the next cycle of the system 10 then starts. Dough balls 44 fall into the pair of alignment funnels 31 located near the second side 21 of forming conveyor 14. Forming heads 102 begin another reciprocal movement to press still another row of dough balls 44 located below forming head assemblies 36 and 38.

Figure 2:
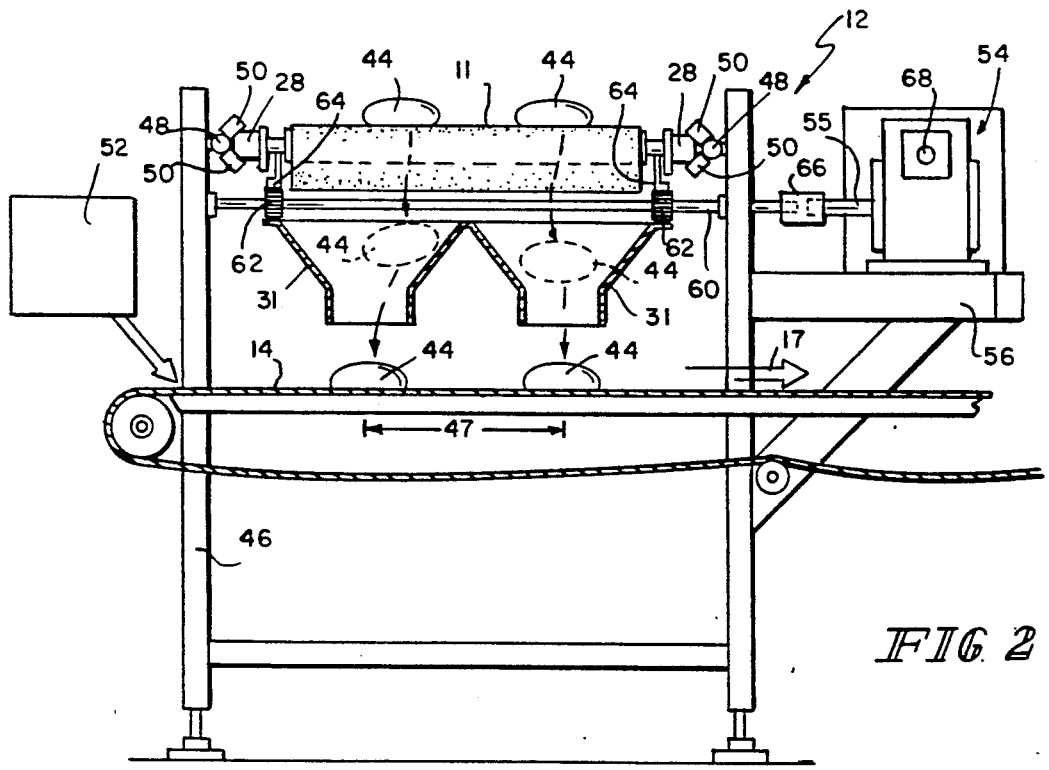
FIG. 2 is a sectional view taken along lines 2—2 of FIG. 1 illustrating dough balls falling off the output end of the delivery conveyor through a pair of alignment funnels and onto the forming conveyor.
Figure 3:
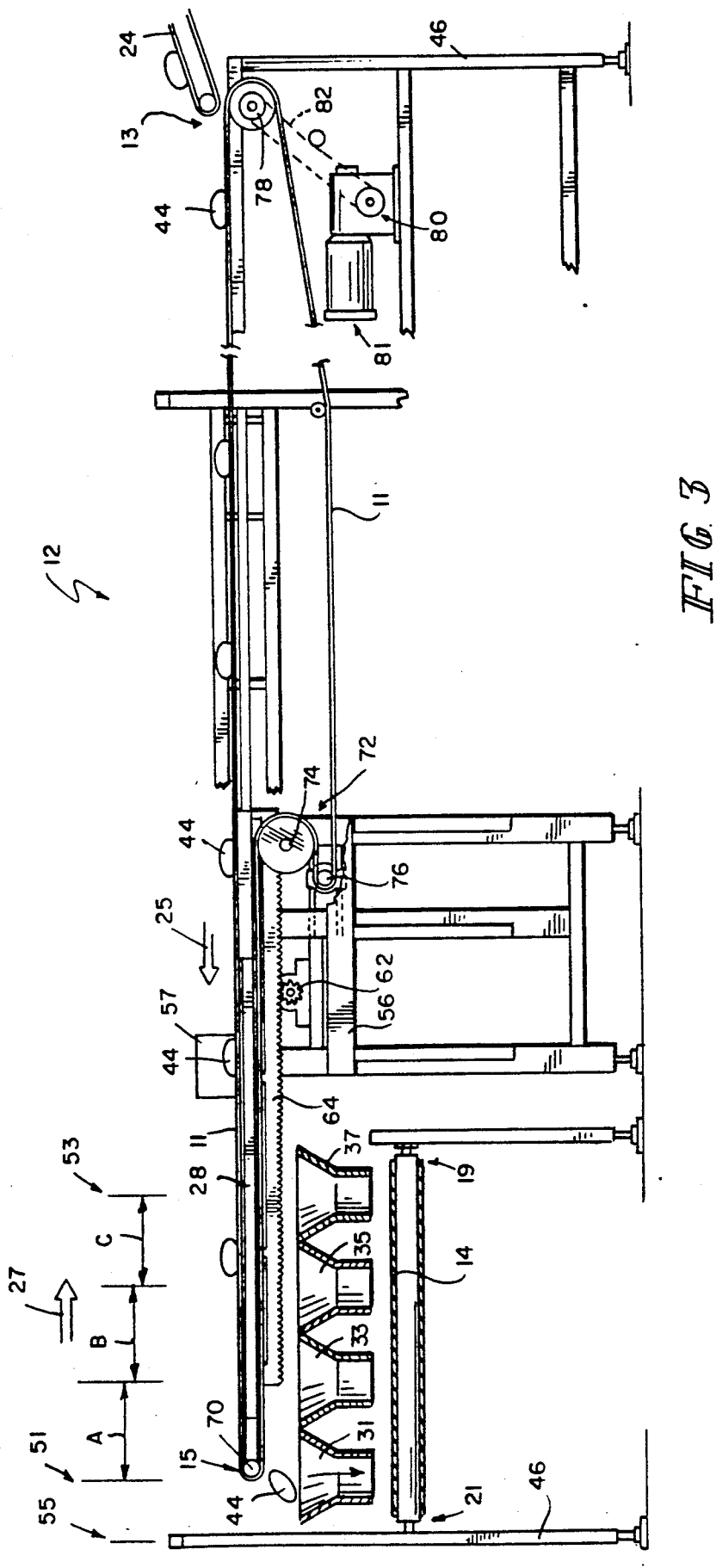
FIG. 3 is a right side elevational view of the delivery conveyor illustrated in FIG. 1.

The delivery conveyor 12 is best shown in FIGS. 2—3. The delivery conveyor 12 includes a conveyor belt 11 moving in the direction of arrow 25. A drive roller 78 for moving conveyor belt 11 is rotated by a drive chain 82 coupled to gear box 80 and drive motor 81. A support frame 46 supports the delivery conveyor 12 above the ground. A continuous stream of dough balls 44 enter the first end 13 of delivery conveyor 12 on conveyor 24 from a proofer oven (not shown). The dough balls 44 are transported in the direction of arrow 25 toward second end 15 of delivery conveyor 12.

Second end 15 of delivery conveyor 12 is positioned above forming conveyor 14. While forming conveyor 14 is stationary, delivery conveyor 12 drops dough balls 44 into the alignment funnels 31, 33, 35, and 37 situated between delivery conveyor 12 and forming conveyor 14. Carriage 28 includes a head roller 70 defining the second end 15 of delivery conveyor 12. Carriage 28 is movable from an extended home position illustrated by location 51 to a retracted position illustrated by location 53 to align the head roller 70 of delivery conveyor 12 in a predetermined position with respect to forming conveyor 14 to drop a single dough ball 44 in the each alignment funnel 31, 33, 35, and 37.

Movement of the carriage 28 is controlled by a drive motor (not shown) coupled to a gear box 54 by a drive shaft 68 as shown in FIG. 2. The drive motor (not shown) is a brushless servo motor model number 306-12XA available from Moog Inc., Electronics & Systems Division. Gear box 54 is a single reduction worn gear reducer model number 1425 available from Grove Gear, Division of Regal-Beloit Corporation. A coupling (not shown) is used to couple the drive motor (not shown) to gear box 54. The coupling (not shown) is a Type AX, Size 10, 4-bolt close coupled double flexing coupling which is modified to have $WR^2 = 2.34$ Lb-In. This coupling (not shown) is available from Warner Electric. A support member 56 supports the drive motor (not shown) and the gear box 54 in the proper location relative to drive carriage 28.

An output shaft 55 of gear box 54 is coupled to a drive shaft 60 by a suitable coupling 66. Drive shaft 60 includes first and second tooth spur gears 62 which cooperate with a pair of gear racks 64 on carriage 28 to move carriage 28 between its extended and retracted position 51 and 53. Carriage 28 moves along cam follower rails 48. Cam follower bearings 50 are coupled to carriage 28 to facilitate movement of the carriage 28.

FIG. 2 illustrates the side-by-side position of the first pair of alignment funnels 31 over the forming conveyor 14. Dough balls 44 drop through the alignment funnels 31 to position the dough balls 44 on the forming conveyor 14 a predetermined distance apart illustrated by dimension 47. Distance 47 is about 16 inches in length. After dough balls 44 are dropped through each pair of alignment funnels 31, 33, 35, and 37, forming conveyor 14 moves a predetermined distance in the direction of arrow 17. An optional crumb depositor 52 can be included to deposit crumbs on conveyor 14 prior to dropping dough balls 44 on conveyor 14.

The range of motion of carriage 28 is best illustrated in FIG. 3. The sequence of movement of carriage 28 begins with second end 15 of delivery conveyor 12 positioned at location 51 which corresponds to the extended home position 51 of carriage 28. When second end 15 of delivery conveyor 12 is positioned in the extended home position 51, a pair of dough balls 44 drops through the first pair of alignment funnels 31 situated near second side portion 21 of forming conveyor 14 to align the pair of dough balls 44 in a first predetermined position.

Carriage 28 then retracts a predetermined distance illustrated by dimension A in the direction of arrow 27. The next pair of dough balls 44 drops from the second end 15 of delivery conveyor 12 through alignment funnels 33 to position the dough balls 44 at a second predetermined position of the forming conveyor 14. Carriage 28 then retracts a second predetermined distance in the direction of arrow 27 illustrated by dimension B to align second end 15 of delivery conveyor 12 with the third pair of alignment funnels 35. The next pair of dough balls 44 drops through the pair of alignment funnels 35 to position the dough balls 44 on the forming conveyor in a third predetermined position. Finally, carriage 28 retracts another distance illustrated by dimension C to the fully retracted position 53 to align the second end 15 of delivery conveyor 12 with the pair of alignment funnels 37 located near first side 19 of forming conveyor 14 to drop dough balls 44 at a forth predetermined position. After the pair of dough balls 44 drops through the last pair of alignment funnels 37, the carriage 28 moves forward in the direction of arrow 25 to return to the extended home position 51.

The carriage 28 moves from the retracted position 53 to the extended position 51 at a speed faster than the speed of delivery conveyor belt 11 so that the second end 15 is extended to its home position 51 before the trailing pair of dough balls 44 reaches the second end 15 on belt 11. This prevents dough balls 44 from falling off second end 15 of delivery conveyor 12 while the carriage 28 moves from the retracted position 53 to the extended position 51 before the second end 15 reaches its extended home position 51.

A tension control mechanism 72 is used to maintain a substantially constant tension in conveyor belt 11 upon reciprocating movement of carriage 28. Tension control mechanism 72 includes a bend-back roller 74 coupled to carriage 28 and a stationary roller 76.

FIGS. 1-3 illustrate the delivery system used for supplying dough balls 44 to forming head assemblies 36 and 38 for pressing large dough balls 44 with four forming heads 102. Therefore, four pairs of alignment funnels 31, 33, 35, and 37 are used to position dough balls 44 on forming conveyor 14. It is understood that the number of pairs of alignment funnels must be increased if smaller dough balls 44 are processed. The number of pairs of alignment funnels corresponds to the number of forming heads 102, 104, or 106 being used to press the dough balls 44. Five pairs of alignment funnels are used with forming heads 104, and six pairs of alignment funnels are used with forming heads 106.

A sensor 57 is used to detect the distance between a leading pair of dough balls 44 and an adjacent trailing pair of dough balls 44 moving on the conveyor belt 11. The distance between each pair of dough balls 44 must be large enough to permit the carriage 28 to retract to its next position before the next pair of dough balls 44 falls off second end 15 of delivery conveyor 12. If sensor 57 detects that a trailing pair of dough balls 44 is too close to a leading pair of dough balls 44, a control signal is sent to the drive motor (not shown) for controlling movement of carriage 28. The carriage 28 is then extended to move second end 15 of delivery conveyor 12 past the extended home position 51 to a position illustrated by location 55 in FIG. 3. In this position, the trailing pair of dough balls 44 that was too closely positioned to the leading pair of dough balls 44 are dropped off the second end 15 of conveyor 12 beyond the second side 21 of forming conveyor 14 into a container (not shown). This prevents more than one dough ball 44 from falling into each alignment funnel 31, 33, 35, or 37 during each cycle of the carriage 28. After proper spacing of the dough balls 44 is again detected, the carriage 28 resumes dropping dough balls 44 in the appropriate pair of alignment funnels 31, 33, 35, or 37.

When positioning irregularly shaped articles such as dough balls 44 on forming conveyor 14, the dough balls 44 may have a tendency to fall onto forming conveyor 14 in nonuniform shapes. Dough balls 44 falling through funnels 31, 33, 35, and 37 can have a center of mass which is not situated at the center of funnels 31, 33, 35, and 37. Dough balls 44 may settle about random points not centered precisely in the predetermined positions on forming conveyor 14. Therefore, the dough balls 44 may be misaligned with forming heads 102, 104, or 106 which would cause the dough balls 44 to be pressed off center.

Figure 10:
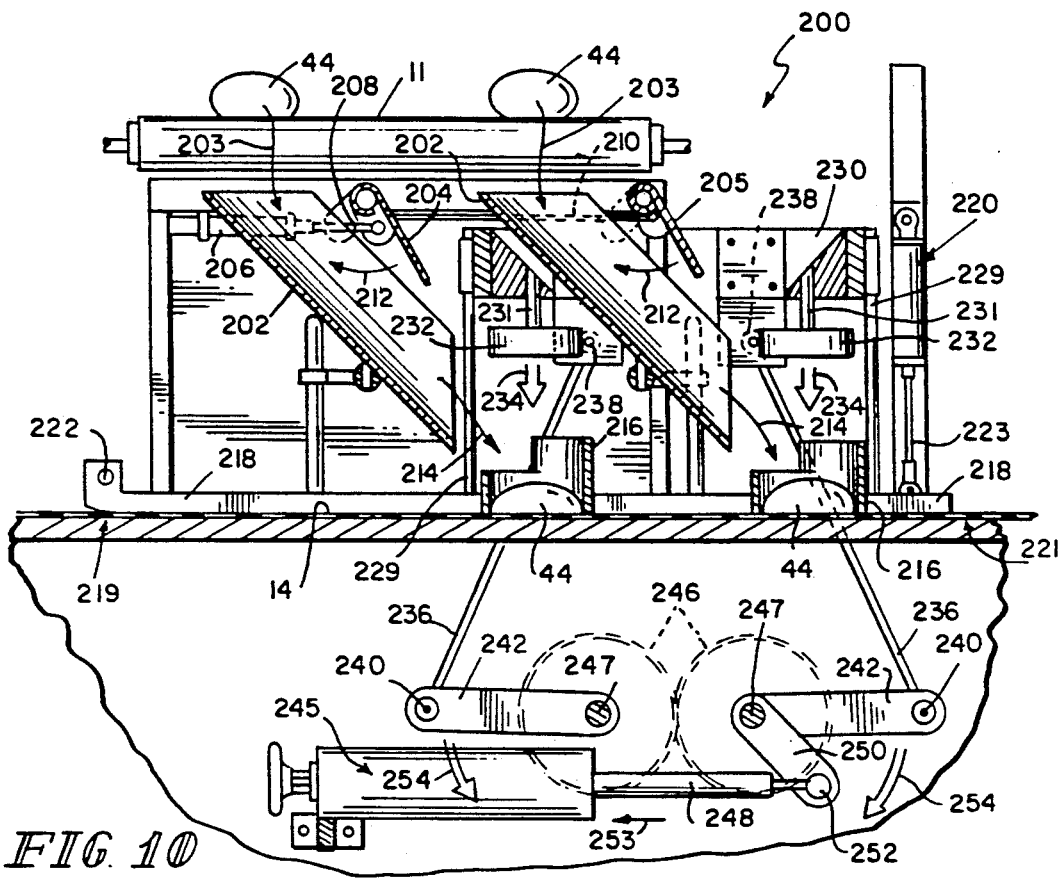
FIG. 10 is an elevational view of an embodiment of a mechanism for centering dough balls in a predetermined pattern on the forming conveyor illustrating a piston frame assembly for centering the dough balls spaced apart from a set of centering rings.
Figure 11:
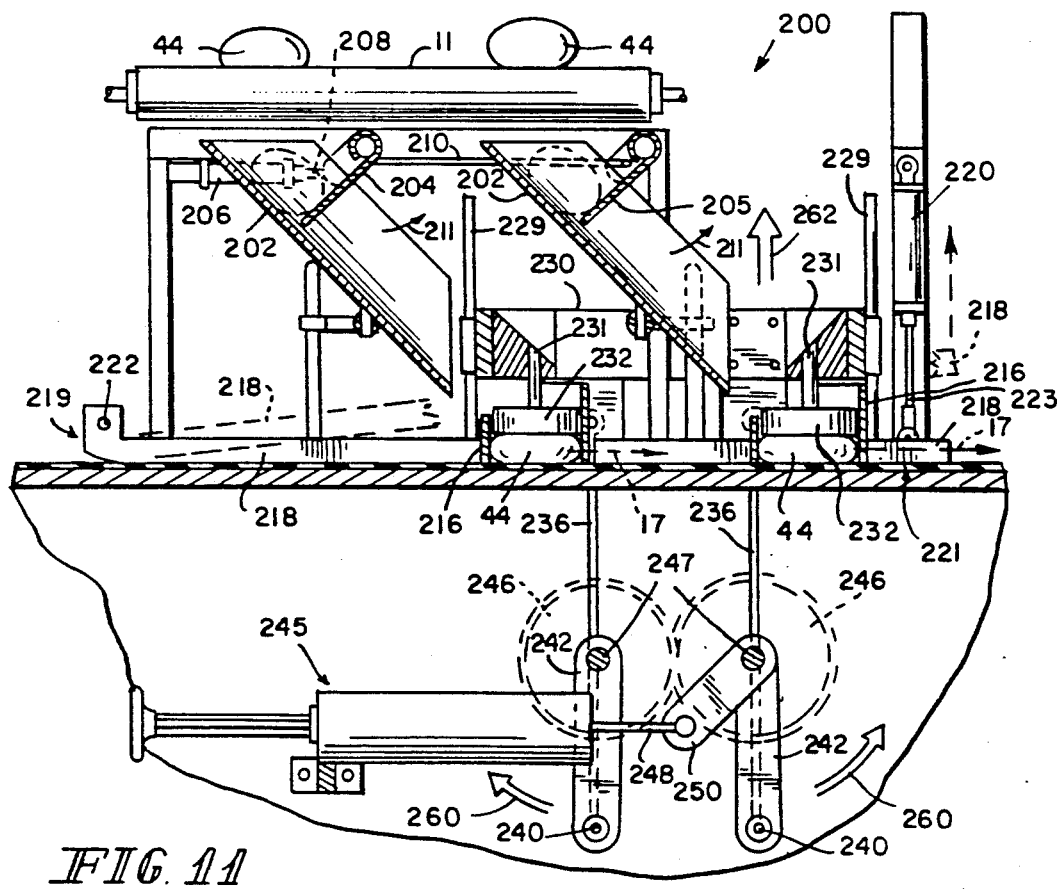
FIG. 11 is a view similar to the view of FIG. 10 illustrating the piston frame assembly located in close proximity to the forming conveyor for centering the dough balls inside the centering rings.

An embodiment of an alignment and centering mechanism 200 of the present invention is provided for centering nonuniformly shaped articles such as dough balls 44 and is illustrated in FIGS. 10 and 11. Dough balls 44 drop off second end 15 of delivery conveyor 12 in the direction of arrows 203 into alignment funnels or troughs 202. As shown in FIG. 11, when dough balls 44 fall into troughs 202, they are held in position by gate members 204 and 205. Timing for the movement of delivery conveyor 12 is the same as when alignment funnels 31, 33, 35, and 37 are used.

An air cylinder 206 for controlling movement of gate members 204 and 205 includes an actuator arm 208 coupled to first gate member 204. A second actuator arm 210 interconnects first gate member 204 and second gate member 205. As air cylinder 206 moves from a retracted position shown in FIG. 11 to an extended position shown in FIG. 10, gate members 204 and 205 move in the direction of arrows 211 to the open position shown in FIG. 10. Dough balls 44 situated inside troughs 202 then fall from the troughs 202 in the direction of arrows 214 into centering rings 216 located above forming conveyor 14. It is understood that any type of troughs, chutes, funnels, channels, or other alignment member for transporting dough balls 44 from delivery conveyor 12 to forming conveyor 14 can be used to align or drop the dough balls 44 into the rings 216.

As dough balls 44 fall into rings 216, piston frame 230 is located in the position shown in FIG. 10 so that pistons 232 are spaced apart from the rings 216 to permit the dough balls 44 to enter the rings 216. After dough balls 44 pass gate members 204 and 205, cylinder 206 moves from its extended position to its retracted position to move gate members 204 and 205 in the direction of arrows 212 back to the closed position shown in FIG. 11 to retain the next set of dough balls 44 falling from delivery conveyor belt 11 into troughs 202.

Piston cylinder 245 controls movement of the piston frame 230 relative to the forming conveyor 14. Piston frame 230 moves along four posts 229 located at the four corners of the piston frame 230. A plurality of pistons 232 are connected to piston frame 230 by connecting rods 231 to suspend the pistons 232 over forming conveyor 14 above the rings 216. Pistons 232 move downward in the direction of arrows 234 to engage and center dough balls 44 located inside rings 216.

Piston frame 230 is connected to first and second control arms 242 by tie rods 236. Tie rods 236 are pivotably coupled to piston frame 230 at locations 238. Tie rods 236 are pivotably coupled to control arms 242 at locations 240. An actuator arm 248 of cylinder 245 is connected to control arm 250 at location 252. Control arms 242 and 250 are rigidly coupled to the drive shafts 247 of gears 246.

Movement of actuator arm 248 from the extended position shown in FIG. 10 to the retracted position shown in FIG. 11 causes movement of control arms 242 in the direction of arrows 254 shown in FIG. 10 to move piston frame 230 downward in the direction of arrows 234. FIG. 11 shows the piston frame 230 in the dough ball 44 centering position in close proximity to forming conveyor 14. Pistons 232 engage dough balls 44 located inside rings 216 to center the center of mass of the dough balls 44 in the rings 216.

By pressing the dough balls 44 inside rings 216, the pistons 232 cause the proper placement of irregularly shaped dough balls 44 on the forming conveyor 14. Without the use of rings 216, irregularly shaped dough balls 44 may tend to settle about their center of mass at a random point which may not be centered with the predetermined position on forming conveyor 14. Therefore, the alignment and centering mechanism 200 causes the dough balls 44 to be properly centered with forming heads 102, 104, or 106 of forming head assemblies 36 and 38.

After the dough balls 44 are centered by pistons 232 as shown in FIG. 11, cylinder 245 moves actuator arm 248 from its retracted position shown in FIG. 11 to its extended position shown in FIG. 10. This movement of actuator arm 248 causes control arms 242 to move in the direction of arrows 260 which causes piston frame 230 to move in the direction of arrow 262 away from forming conveyor 14.

Each of the rings 216 are interconnected by a frame assembly 218. A first end 219 of frame assembly 218 is pivotably connected to a support frame (not shown) at location 222. A second end 221 of frame assembly 218 is connected to air cylinder 220. After piston frame 230 reaches the spaced apart position shown in FIG. 10, air cylinder 220 moves actuator arm 223 from its extended position shown in FIGS. 10 and 11 to a retracted position (not shown).

Movement of actuator arm 223 to the retracted position causes pivotal movement of frame assembly 218 about pivot point 222 to the dotted position shown in FIG. 11. This moves rings 216 away from forming conveyor 14. Therefore, the centered dough balls 44 can be transported in the direction of arrows 17 on forming conveyor 14 toward the forming head assemblies 36 and 38.

Actuator arm 223 then moves back to its extended position to place rings 216 in close proximity to forming conveyor 14 The next set of dough balls 44 then fall from the alignment troughs 202 into rings 216. The process then repeats itself.

Eight centering rings 216, alignment troughs 202, and pistons 232 are used when forming heads 102 are selected on forming head assemblies 36 and 38. Ten centering rings 216, alignment troughs 202, and pistons 232 must be used when forming heads 104 are selected. Twelve centering rings 216, alignment troughs 202, and pistons 232 must be used when forming heads 106 are selected.

After the dough balls 44 are arranged in the predetermined position on forming conveyor 14 by the alignment funnels 31, 33, 35, and 37 or by the alignment and centering system 200, the dough balls 44 are transported by forming conveyor 14 toward pressing section 34. The dough balls 44 are arranged in rows which pass under first and second forming head assemblies 36 and 38. The number of dough balls 44 in each row is determined by the number of forming heads 102, 104, and 106 of forming head assemblies 36 and 38 which are being used at any particular time.

Figure 4:
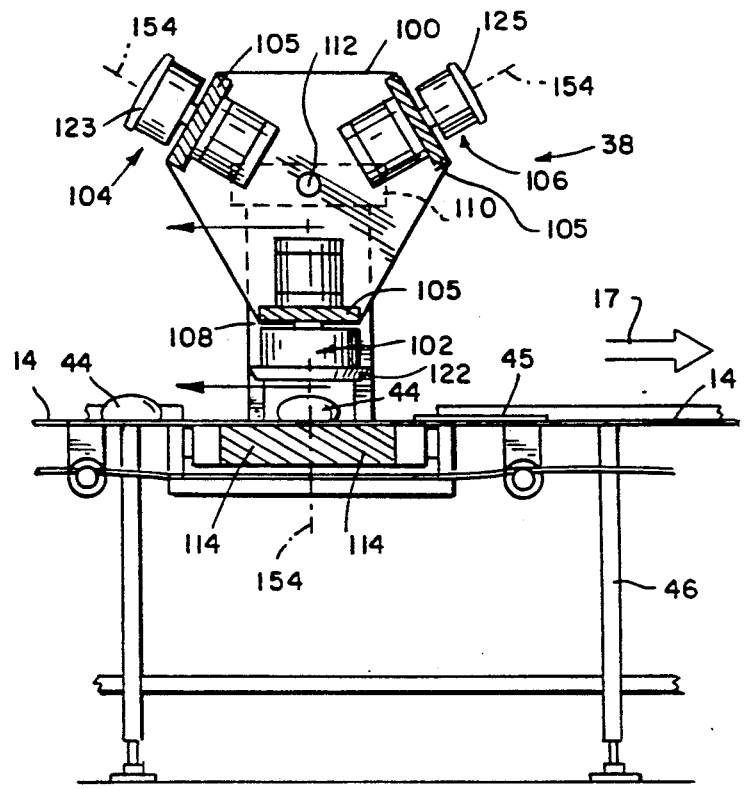
FIG. 4 is a sectional view taken along lines 4—4 of FIG. 1 illustrating a forming head assembly for forming dough balls into predetermined shapes.
Figure 5:
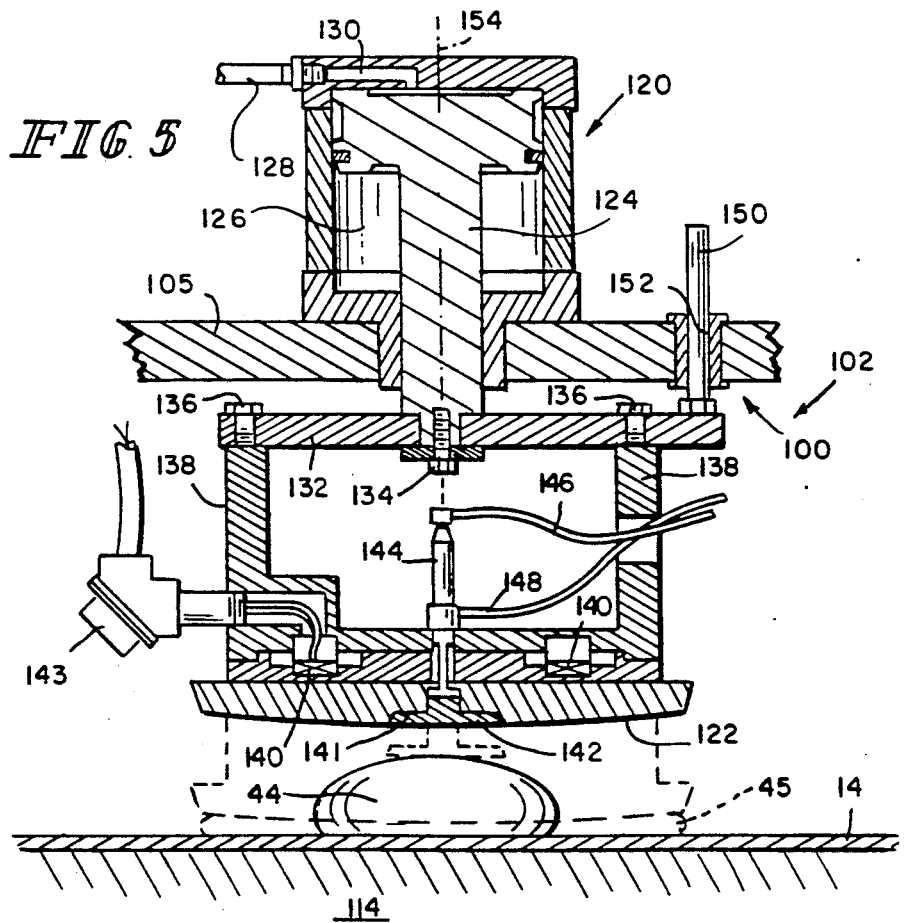
FIG. 5 is a transverse sectional view taken along lines 5—5 of FIG. 4 illustrating one of the forming heads of the forming head assembly.

The configuration of forming head assemblies 36 and 38 is best illustrated in FIGS. 4 and 5. Forming head assemblies 36 and 38 are identical assemblies. Each row of dough balls 44 is pressed by both the first forming head assembly 36 and the second forming head assembly 38 to form flattened dough discs 45. Forming head assembly 38 is illustrated in FIG. 4.

Forming head assembly 38 includes three rows of forming heads 102, 104, and 106 having different sizes for pressing dough balls 44 of varying size. Forming heads 102 include pressing surface 122 having a 12-inch diameter. Forming heads 104 include a pressing surface 123 having an 8-inch diameter. Forming heads 106 include a pressing surface 125 having a 6-inch diameter. As best shown in FIG. 1, each forming head assembly 36 includes four forming heads 102, five forming heads 104, and six forming heads 106.

The forming heads 102, 104, and 106 are coupled to different sides of rotatable support member 100 to extend away from the support member 100 in three different directions. Support member 100 is supported above forming conveyor 14 by pivot mounts 110 and mounting posts 108 located at each end of the support member 100. Support member 100 rotates about a pivot shaft 112 situated along an axis of rotation of support member 100 so that a selected row of forming heads 102, 104, or 106 can be positioned over support surface 114 depending upon the size of the dough balls 44 being processed.

Forming conveyor 14 moves over the top of support surface 114 located below the selected forming heads 102. Support surface 114 provides resistance for forming heads 102 as forming heads 102 press dough balls 44 into the flattened dough discs 45. An entire row of forming heads 102, 104, or 106 moves simultaneously downwardly to engage dough balls 44 situated below the forming heads 102, 104, or 106. Forming heads 102, 104, or 106 then retract and the formed dough discs 45 are moved in the direction of arrow 17 by forming conveyor 14. Forming conveyor 14 is stationary upon the reciprocating movement of the selected row of forming heads 102, 104, or 106.

The configuration of a forming head is best shown in FIG. 5. Forming head 102 includes a drive mechanism 120 situated inside support member 100. Drive mechanism 120 includes an air cylinder 126 and a piston 124 movable from a retracted position to an extended position inside cylinder 126. Movement of piston 124 is controlled by an air supply means 128 through air inlet aperture 130. Air cylinder 126 is coupled to a bridge plate 105 of support member 100. Piston 124 extends through bridge plate 105 to provide reciprocating movement of the forming head 102 from a retracted position to an extended position shown in phantom in FIG. 5 along longitudinal axis 154 of forming head 102.

Forming head 102 includes a pressing surface 112 which engages dough ball 44 to form a flattened dough disc 45. Pressing surface 122 is coupled to piston 124 by a mounting plate 132 and a spacer 138. Mounting plate 132 is coupled to piston 124 by a suitable fastener 134. Spacer 138 is coupled to mounting plate 132 by suitable fasteners 136.

A release plate 142 is situated inside an aperture 141 formed in pressing surface 122. In a first position, a release plate 142 forms a portion of pressing surface 122. Release plate 142 is movable to a second extended position shown in phantom in FIG. 5 by an air cylinder 144. Air cylinder 144 is controlled by air supply lines 146 and 148. Air cylinder 144 is movable from a retracted position defining the first position of release plate 142 to an extended position defining the second position of release plate 142.

Once a dough ball 44 is positioned under forming head 102, forming head 102 moves to its extended position to flatten dough ball 44 into dough disc 45. As forming head 102 begins its upward stroke, air cylinder 144 is actuated to extend release plate 142 away from pressing surface 122. Release plate 142 engages the dough disc 45 and forces the dough disc 45 away from pressing surface 122 to prevent dough disc 45 from sticking to pressing surface 122.

A heating element 140 can be included in forming head 102 to heat pressing surface 122. Heating of the pressing surface 122 with heating element 140 further reduces the likelihood that dough disc 45 will stick to pressing surface 122. Heating element 140 is powered by power supply 143.

An anti-rotation pin 150 is coupled to mounting plate 132. Anti-rotation pin 150 extends through an aperture 152 formed in bridge plate 105 of support member 100. Anti-rotation pin 150 moves inside aperture 152 to prevent rotation of forming head 102 about its longitudinal axis 154 upon reciprocal movement of forming head 102.

After the dough discs 45 are formed by the forming head assemblies 36 and 38, the dough discs 45 move on forming conveyor 14 toward output conveyor 18. A transfer conveyor 16 is situated between forming conveyor 14 and output conveyor 18. Transfer conveyor 16 receives dough discs 45 from the intermittently moving forming conveyor 14 and transfers the dough discs 45 to the continuously moving output conveyor 18.

When forming conveyor 14 is in motion, the speed of transfer conveyor 16 matches the speed of forming conveyor 14 to transfer dough discs from forming conveyor 14 onto transfer conveyor 16. After the dough discs 45 are on transfer conveyor 16, forming conveyor 14 stops. When forming conveyor 14 is stopped, the speed of transfer conveyor 16 matches the speed of output conveyor 18 to transfer dough discs 45 onto the output conveyor 18.

Figure 6:
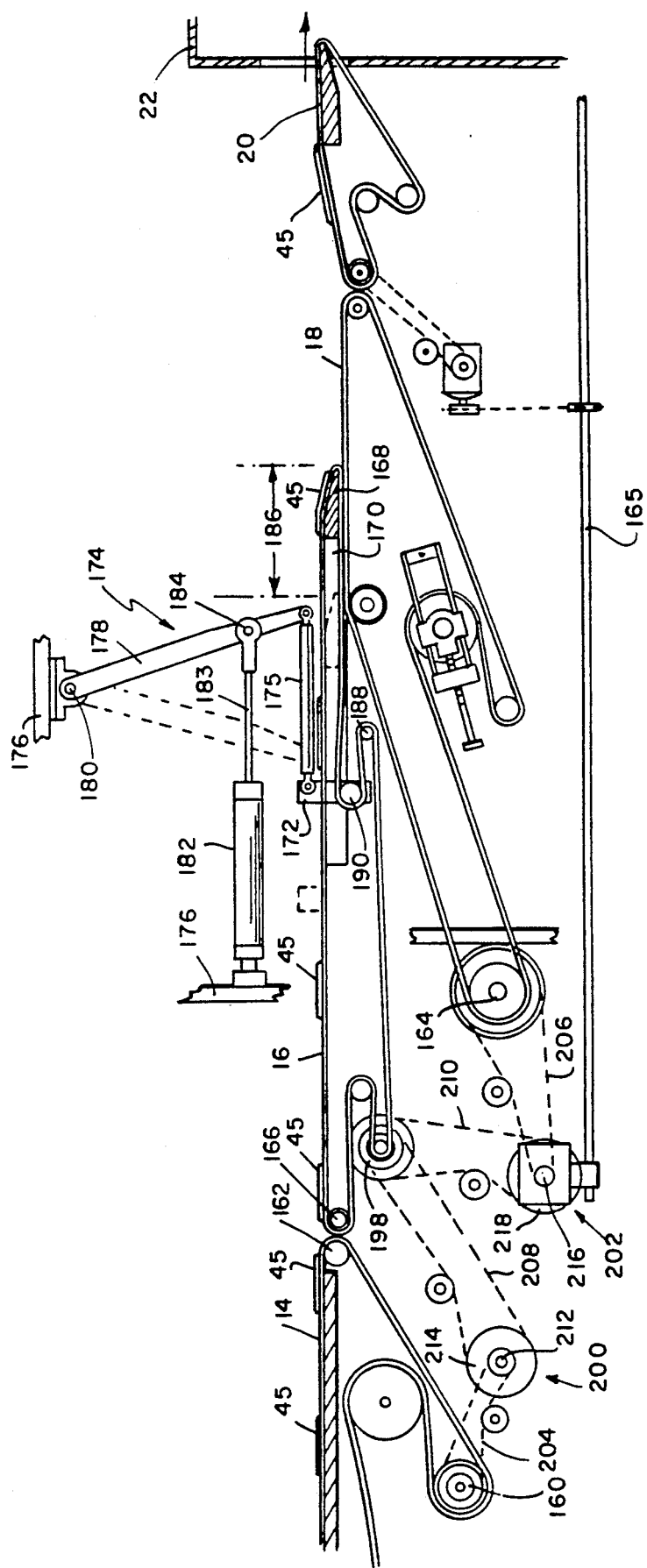
FIG. 6 is a diagrammatical illustration of the transfer conveyor for transferring formed dough balls from the intermittently moving forming conveyor to the continuously moving output conveyor without damaging the formed dough balls.

The transfer conveyor 16 is best illustrated in FIG. 6. Forming conveyor 14 is intermittently moved by drive roller 160. Forming conveyor 14 includes an end roller 162 defining an output end of forming conveyor 14. An end roller 166 defining an input end of transfer conveyor 16 is situated in close proximity to end roller 162 of forming conveyor 14 to receive dough discs 45 from forming conveyor 14.

A head roll 168 of a reciprocating carriage assembly 170 forms the output end of transfer conveyor 16. Carriage assembly 170 includes an end support 172. A control mechanism 174 is used to provide reciprocating movement of carriage assembly 170 from an extended position shown in FIG. 6 to a retracted position shown in phantom FIG. 6 to change the position of the output end of transfer conveyor 16 relative to output conveyor 18. Control mechanism 174 includes a pivot arm 178 coupled at one end to a support frame 176 by pivot mount 180. The other end of pivot arm 178 is coupled to a first end of connecting rod 175. A second end of connecting rod 175 is coupled to end support 172 of carriage assembly 170.

Control mechanism 174 also includes an air cylinder 182 coupled at one end to support frame 176. Air cylinder 182 includes a movable control arm 183 coupled to pivot arm 178 at location 184. Pivot arm 178 is movable from an extended position to a retracted position shown in phantom in FIG. 6 to control movement of carriage assembly 170 from its extended position to its retracted position.

As a dough disc 45 is being transferred from transfer conveyor 16 to output conveyor 18, the carriage assembly 170 moves from its extended position to is retracted position to facilitate transfer of the dough disc 45 to output conveyor 18. After transfer of dough disc 45 is complete, carriage assembly 170 returns to its extended position. The carriage assembly 170 moves from the retracted position to the extended position at a speed faster than the speed of transfer conveyor 16. This prevents the next row of dough discs 45 from moving past head roll 168 before the carriage 170 reaches its extended position.

Dough discs 45 on output conveyor 18 move to an input conveyor 20 of an oven or topping device 22. A jack shaft 165 is used to insure that the speed of output conveyor 18 matches the speed of the input conveyor 20. Carriage assembly 170 includes a bend back roller 190 which cooperates with a stationery roller 188 to maintain the tension of transfer conveyor 16 substantially constant upon reciprocating movement of carriage assembly 170.

During transfer of dough discs 45 from forming conveyor 14 to transfer conveyor 16, it is important that the speed of transfer conveyor 16 matches the speed of forming conveyor 14. An air clutch 200 includes a driven shaft and sprocket 212 connected to drive roller 160 of forming conveyor 14 by drive chain 204. Air clutch 200 also includes a driving shaft and sprocket 214 connected to drive roller 198 of transfer conveyor 16 by drive chain 208. When forming conveyor 14 is driven by driver roller 160 to move the dough discs 45, air clutch 200 is engaged to couple drive roller 198 to drive roller 160. Therefore, drive roller 198 rotates at the same speed as drive roller 160 so that the speed of transfer conveyor 16 matches the of forming conveyor 14.

During movement of forming conveyor 14, air clutch 202 is disengaged.

When forming conveyor 14 is stationary, the speed of transfer conveyor 16 must match the speed of output conveyor 18 to transfer dough discs 45 from the transfer conveyor 16 to the output conveyor 18. Therefore, when drive roller 160 is stationary, air clutch 200 is disengaged and air clutch 202 is engaged.

Air clutch 202 includes a driven shaft and sprocket 216 connected to drive roller 164 of output conveyor 18 by drive chain 206. Air clutch 202 also includes a driving shaft and sprocket 218 connected to drive roller 198 of transfer conveyor 16 by drive chain 210. Output conveyor 18 moves at a continuous speed which is slower than the speed of forming conveyor 14 when forming conveyor 14 is in motion.

When air clutch 202 is engaged, carriage assembly 170 is retracted to transfer dough discs 45 to output conveyor 18. After transfer of dough discs 45 to output conveyor 18 is complete, carriage assembly 170 is extended back to the extended position. Air clutch 202 is then disengaged and air clutch 200 is engaged as forming conveyor 14 begins to move to transfer another row of dough discs from forming conveyor 14 to transfer conveyor 16. Air clutches 200 and 202 are "Air Champ" Model MW air clutches available from Horton Manufacturing Company, Inc.

Timing for the movement of delivery conveyor 12, forming conveyor 14, transfer conveyor 16, and forming head assemblies 36 and 38 is determined by the size of the dough ball 44 being processed. The forming head assemblies 36 and 38 include three different sizes of forming heads 102, 104, and 106. forming heads 102 are used to produce dough discs 45 having a twelve inch diameter. Forming heads 104 are used to form dough discs 45 having an eight inch diameter. Forming heads 106 are used to form dough discs 45 having a six inch diameter.

Figure 7:
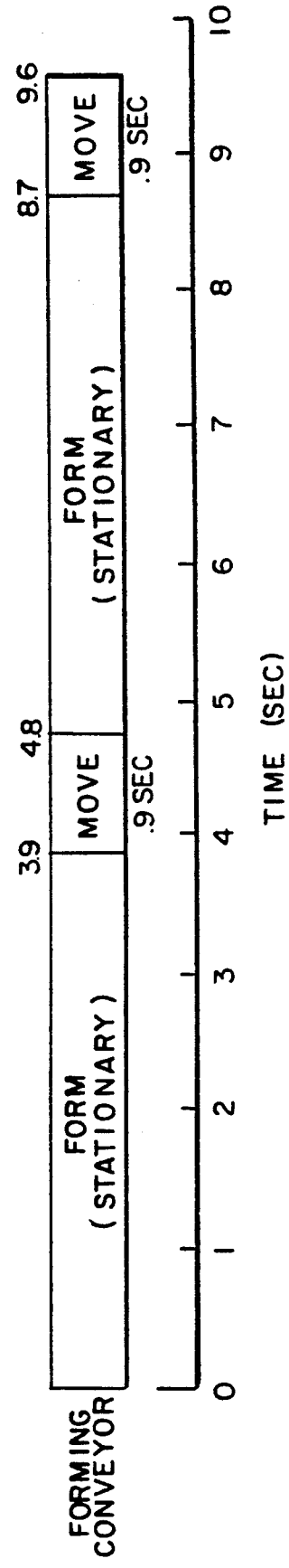
FIG. 7 is a timing chart illustrating the operation of the dough processing system for producing twelve inch diameter dough discs.
Figure 8:
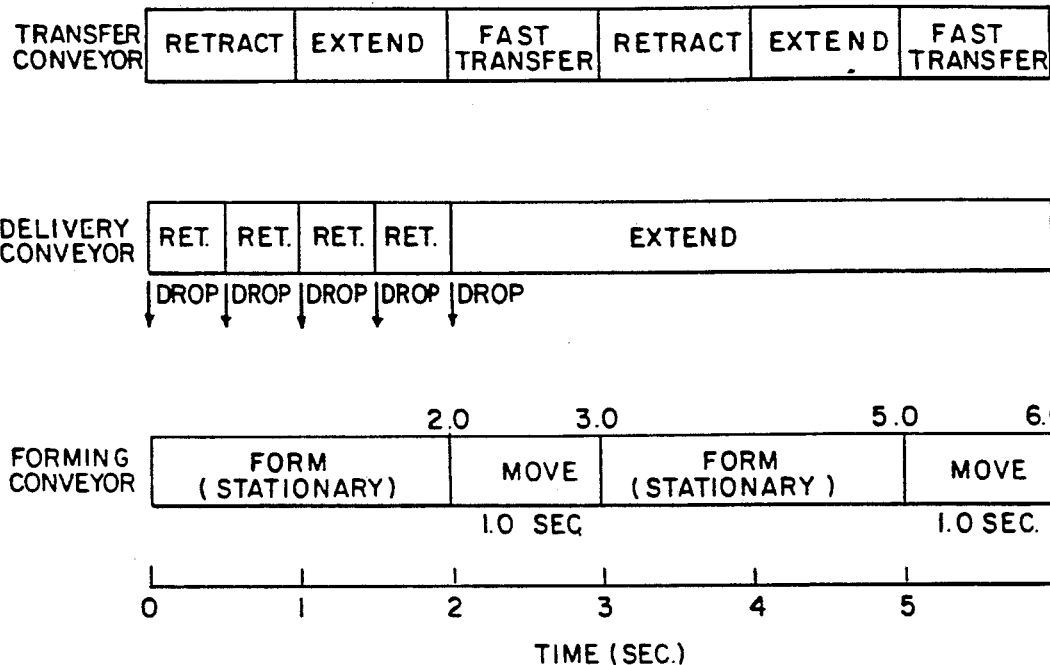
FIG. 8 is a timing chart illustrating the operation of the dough processing system for producing eight inch diameter dough discs.
Figure 9:
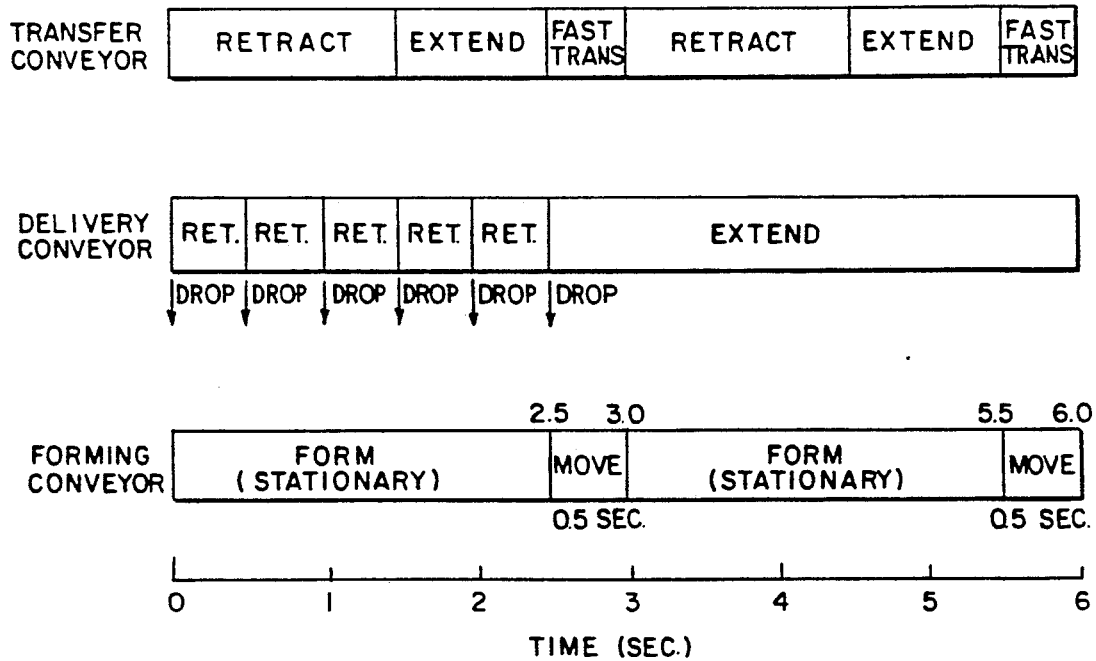
FIG. 9 is a timing chart illustrating the operation of the dough processing system for producing six inch diameter dough discs.

Timing charts for processing the different size dough balls are shown in FIGS. 7-9. When the large forming heads 102 are used to produce twelve inch diameter dough discs 45, the timing of delivery conveyor 12, forming conveyor 14, transfer conveyor 16, and forming heads 102 is illustrated in FIG. 7.

Beginning at the start of each cycle or time zero, delivery conveyor 12 drops a first pair of dough balls into a first pair of alignment funnels 31. Carriage 28 then retracts to move the second end 15 of delivery conveyor 12 relative to the forming conveyor 14. Dough balls 44 are dropped in four different positions on forming conveyor 14 at times of 0, 1.3, 2.6, and 3.9 seconds. From 3.9 seconds to 9.6 seconds the carriage 28 of delivery conveyor 12 extends back to the extended home position 51 at a speed faster than the speed of delivery conveyor belt 11.

Forming conveyor 14 is stationary while dough balls 44 are dropped onto forming conveyor 14 from delivery conveyor 12. While the forming conveyor 14 is stationary, forming head assemblies 36 and 38 extend the forming heads 102 situated over support surface 114 to press dough balls 44 into dough discs 45. While forming conveyor is stationary, drive roller 198 of transfer conveyor 16 is coupled to drive roller 164 of output conveyor 18 to drive transfer conveyor 16 at the slow speed. From 0 to 3.9 seconds, transfer carriage 170 retracts and extends to transfer dough discs 45 from transfer conveyor 16 to output conveyor 18.

From 3.9 seconds to 4.8 seconds, forming conveyor 14 moves to transfer a row of dough discs 45 to transfer conveyor 16. While forming conveyor 14 is moving, drive roller 198 of transfer conveyor 16 is coupled to drive roller 160 of forming conveyor 14 so that the speed of transfer conveyor 16 matches the speed of forming conveyor 14. This step is indicated by the fast transfer (FAST TRANS.) of the transfer conveyor in FIG. 7.

From 4.8 to 8.7 seconds the forming heads 102 extend and retract to form another row of dough discs 45. Transfer conveyor 16 is driven at the slow speed of the output conveyor 18 during this time period. Also during this time period, carriage 170 of transfer conveyor 16 retracts to transfer another row of dough discs 45 from transfer conveyor 16 to output conveyor 18. Carriage 170 then extends back to its extended position at a speed faster than transfer conveyor 16 while the transfer conveyor 16 is driven at the slow speed.

From 8.7 to 9.6 seconds forming conveyor 14 moves to transfer another row of dough discs 45 to transfer conveyor 16. Drive roller 198 of transfer conveyor 16 is coupled to the drive roller 160 of forming conveyor 14 during this time period. One cycle is then complete. The next cycle then begins at time zero.

FIGS. 8 and 9 illustrate the timing charts for processing medium (eight inch diameter) and small (six inch diameter) sized dough balls 44. Labels on these diagrams correspond to the same labels discussed above with reference to the large dough ball 44 processing timing chart shown in FIG. 7.

It is understood that although the delivery conveyor system, the transfer conveyor system, the forming system, and the alignment systems have been described in detail with reference to transporting, positioning, and forming dough balls, that these systems may be used to transport, position, and form various types of articles other than dough balls.

Although the invention has been described in detail with reference to a preferred embodiment, variations and modifications exist within the scope and spirit of the invention as described and defined in the following claims.

What is claimed is:

1. A dough ball processing apparatus comprising
   means for simultaneously forming at least two dough balls aligned in a predetermined pattern into predetermined shapes,
   an intermittently moving forming conveyor including an input region for receiving dough balls aligned in the predetermined pattern and for transporting the dough balls to a predetermined position below the forming means and an output region for transporting formed dough balls away from the forming means,
   a continuously moving delivery conveyor including an output end situated above the input region of the forming conveyor for supplying a continuous stream of dough balls to the input region of the forming conveyor, and
   alignment means located between the delivery conveyor and the forming conveyor for positioning the dough balls received from the output end of the delivery conveyor in the predetermined pattern on the forming conveyor.

2. The apparatus of claim 1, wherein the forming means includes a rotatable support member having first and second side portions and an axis of rotation, a first set of forming heads coupled to the first side portion of the support member aligned in the predetermined pattern, a second set of forming heads coupled to the second side portion of the support member aligned in the predetermined pattern, means for mounting the support member in the predetermined position above the forming conveyor to align a selected set of the first and second sets of forming heads over the forming conveyor, and means for moving the selected set of forming heads relative to the forming conveyor to form the dough balls aligned in the predetermined pattern on the forming conveyor.

3. The apparatus of claim 2, wherein the first set of forming heads each include a first forming surface having a first predetermined forming area, and the second set of forming heads each include a second forming surface having a second predetermined forming area different than the first predetermined forming area.

4. The apparatus of claim 2, wherein each of the first and second sets of forming heads include a release plate, a pressing surface for pressing a dough ball against the forming conveyor to form a flattened dough disc, and means for extending the release plate away from the pressing surface upon upward movement of the forming head away from the forming conveyor so that the release plate engages the dough disc and forces the dough disc away from the pressing surface to prevent the dough disc from sticking to the pressing surface.

5. The apparatus of claim 1, wherein the delivery conveyor includes a carriage assembly having a head roll defining the output end of the delivery conveyor, and means for moving the carriage assembly from an extended position to a retracted position to change the position of the output end of the delivery conveyor with respect to the forming conveyor to supply dough balls to a plurality of predetermined locations on the forming conveyor.

6. The apparatus of claim 5, further comprising means for sensing the distance between adjacent dough balls moving on the delivery conveyor toward the forming conveyor, the sensing means comparing the distance between adjacent dough balls to a predetermined distance and generating a control signal if the distance between adjacent dough balls is less than the predetermined distance, means for coupling the sensing means to the moving means, the moving means moving the carriage assembly beyond the extended position to drop dough balls situated closer than the predetermined distance together off the output end of the delivery conveyor.

7. The apparatus of claim 1, wherein the alignment means include a plurality of alignment funnels, each alignment funnel having an input end for receiving a dough ball from the output end of the delivery conveyor and an output end positioned over a predetermined location on the forming conveyor.

8. The apparatus of claim 1, further comprising a continuously moving output conveyor and transferring means interconnecting the output region of the intermittently moving forming conveyor and the continuously moving output conveyor for transferring formed dough balls from the intermittently moving forming conveyor to the continuously moving output conveyor without damaging the formed dough balls.

9. The apparatus of claim 8, wherein the transferring mean includes a transfer conveyor having a first end situated in close proximity to the output region of the forming conveyor for receiving formed dough balls from the forming conveyor and a second end situated in close proximity to the output conveyor for delivering formed dough balls to the output conveyor.

10. The apparatus of claim 9, wherein the forming conveyor includes a normally stationary forming conveyor belt and first drive means for intermittently moving the forming conveyor belt at a first predetermined speed, and the output conveyor includes an output conveyor belt and second drive means for continuously moving the output conveyor at a second predetermined speed slower than the first predetermined speed, the transferring means further including third drive means for moving the transfer conveyor in a predetermined direction to transfer formed dough balls from the forming conveyor to the output conveyor, first control means for coupling the third drive means to the first drive means only when the forming conveyor is moving so that the transfer conveyor moves at the first predetermined speed during movement of the forming conveyor to transfer formed dough balls from the forming conveyor to the transfer conveyor, and second control means for coupling the third drive means to the second drive means only when the forming conveyor is stationary so that the transfer conveyor moves at the second predetermined speed to transfer formed dough balls from the transfer conveyor to the output conveyor.

11. The apparatus of claim 10, wherein the first control means includes a first air clutch having a driven shaft coupled to the first drive means, a driving shaft coupled to the third drive means, and means for engaging the first air clutch to couple the first drive means to the third drive means only during movement of the forming conveyor, and the second control means includes a second air clutch having a driven shaft coupled to the second drive means, a driving shaft coupled to the third drive means, and means for engaging the second air clutch to couple the second drive means to the third drive means only when the first conveyor is stationary.

12. The apparatus of claim 9, further comprising a transfer carriage assembly including a head roller defining the second end of the transfer conveyor and carriage moving means for moving the transfer carriage in a direction opposite to the predetermined direction of movement of the transfer conveyor to change the position of the second end of the transfer conveyor relative to the output conveyor during transfer of formed dough balls from the transfer conveyor to the output conveyor.

13. A transfer conveyor apparatus for transferring articles from a first conveyor system to a second conveyor system, the first conveyor system including a normally stationary first conveyor and first drive means for intermittently moving the first conveyor at a first predetermined speed, and the second conveyor system including a second conveyor and second drive means for continuously moving the second conveyor at a second predetermined speed, the second predetermined speed being different than the first predetermined speed, the transfer conveyor apparatus comprising
 a transfer conveyor having a first end situated in close proximity to the first conveyor system for receiving articles from the first conveyor and a second end situated in close proximity to the second conveyor system for delivering articles to the second conveyor, third drive means for moving the transfer conveyor in a predetermined direction to transfer articles from the first conveyor to the second conveyor, first control means for coupling the third drive means to the first drive means only when the first conveyor is moving so that the transfer conveyor moves at the first predetermined speed during movement of the first conveyor to transfer articles from the first conveyor to the transfer conveyor, and second control means for coupling the third drive means to the second drive means only when the first conveyor is stationary so that the transfer conveyor moves at the second predetermined speed to transfer articles from the transfer conveyor to the second conveyor.

14. The apparatus of claim 13, wherein the first control means includes a first air clutch having a driven shaft coupled to the first drive means, a driving shaft coupled to the third drive means, and means for engaging the first air clutch to couple the first drive means to the third drive means only during movement of first conveyor, and the second control means includes a second air clutch having a driven shaft coupled to the second drive means, a driving shaft coupled to the third drive means, and means for engaging the second air clutch to couple the second drive means to the third drive means only when the first conveyor is stationary.

15. The apparatus of claim 13, further comprising a transfer carriage assembly including a head roll defining the second end of the transfer conveyor and carriage moving means for moving the transfer carriage in a direction opposite to the predetermined direction movement of the transfer conveyor to change the position of the second end of the transfer conveyor relative to the second conveyor during the transfer of articles from the transfer conveyor to the second conveyor.

16. The apparatus of claim 15, wherein the carriage moving means includes a control mechanism for providing reciprocating movement of the transfer carriage between an extended position and a retracted position to change the position of the second end of the transfer conveyor relative to the output conveyor, the control mechanism moving the transfer carriage from the extended position to the retracted position during the transfer of articles from the transfer conveyor to the output conveyor.

17. The apparatus of claim 16, wherein the control mechanism includes a pivot arm coupled to the transfer carriage and an air cylinder coupled to the pivot arm for controlling movement of the transfer carriage between the extended position and the retracted position.

18. The apparatus of claim 15, wherein the transfer carriage includes means for maintaining a substantially constant tension of the transfer conveyor upon movement of the transfer carriage relative to the output conveyor.

19. A apparatus for supplying and positioning articles on an output conveyor in a predetermined pattern, the apparatus comprising a delivery conveyor including a first end for receiving a continuous stream of spaced apart articles, a second end situated above the output conveyor, a delivery conveyor belt, and drive means for continuously moving the delivery conveyor belt at a predetermined speed to move the articles from the first end to the second end, the articles falling off the second end of the delivery conveyor onto the output conveyor, means for moving the second end of the delivery conveyor relative to the output conveyor to drop articles from the second end of the delivery conveyor in a plurality of predetermined locations on the output conveyor, and alignment means situated between the output conveyor and the delivery conveyor for aligning the articles in the predetermined pattern on the output conveyor.

20. The apparatus of claim 19, wherein the alignment means includes a plurality of alignment funnels, each alignment funnel having an input end for receiving articles falling from the second end of the delivery conveyor and an output end positioned over a predetermined location of the out conveyor.

21. The apparatus of claim 19, wherein the delivery conveyor includes a carriage assembly having a head roll defining the second end of the delivery conveyor, the carriage assembly being movable from an extended position to a retracted position to change the position of the second end of the delivery conveyor with respect to the output conveyor, the moving means moving the carriage from the extended position a predetermined distance toward the retracted position after each article drops from the second end of the delivery conveyor to position articles in a plurality of predetermined locations on the output conveyor.

22. The apparatus of claim 21, further comprising means for sensing the distance between adjacent spaced apart articles moving on the delivery conveyor, the sensing means comparing the distance between adjacent articles to a predetermined distance and generating a control signal if the distance between the adjacent articles is less than the predetermined distance, means for coupling the sensing means to the moving means, the moving means moving the carriage beyond the extended position to drop articles situated closer than the predetermined distance together off the second end of the delivery conveyor beyond the o conveyor.

23. The apparatus of claim 21, wherein the carriage assembly includes a gear rack and the moving means includes a tooth spur gear coupled to a drive shaft, the tooth spur gear engaging the gear rack of the carriage assembly to control movement of the carriage assembly between the extended position and the retracted position.

24. The apparatus of claim 21, wherein the carriage assembly includes means for maintaining a substantially constant tension of the delivery conveyor belt upon movement of the carriage assembly from its extended position to its retracted position.

25. An assembly for forming a dough ball against a support surface, the assembly comprising a rotatable support member having an axis of rotation, a first forming head coupled to a first portion of the support member, the first forming head including a first forming surface having a first predetermined forming area, a second forming head coupled to a second portion of the support member, the second forming head including a second forming surface having a second predetermined forming area different than the first predetermined forming area, means for mounting the support member above the support surface to align a selected one of the first and second forming heads over the support surface, and means for moving the selected forming head between a first position spaced apart from the support surface to permit the dough ball to be positioned on the support surface below the selected forming head and a second position in close proximity to the support surface to form the dough ball against the support surface into a predetermined shape.

26. The assembly of claim 25, wherein the mounting means includes a pivot shaft extending through the support member along the axis of rotation, first and second mounting posts situated on opposite ends of the support member, and means for rotatably coupling the pivot shaft to the first and second mounting posts to position the support member above the support surface.

27. The assembly of claim 26, wherein the mounting means further includes means for rigidly securing the support member to the mounting posts after a selected one of the first and second forming heads is positioned over the support surface to maintain the position of the selected forming head during formation of the dough balls.

28. A transfer conveyor system for transferring articles from a first conveyor system to a second conveyor system, the first conveyor system including a first conveyor and first drive means for moving the first conveyor at a first predetermined speed, and the second conveyor system including a second conveyor and second drive means for moving the second conveyor at a second predetermined speed, the second predetermined speed being different than the first predetermined speed, the transfer conveyor system comprising a transfer conveyor having a first end situated in close proximity to the first conveyor system for receiving articles from the first conveyor and a second end situated in close proximity to the second conveyor system for delivering articles to the second conveyor, third drive means for moving the transfer conveyor in a predetermined direction to transfer articles from the first conveyor to the second conveyor, first control means for coupling the third drive means to the first drive means only during transfer of articles from the first conveyor to the transfer conveyor so that the transfer conveyor moves at the first predetermined speed, and second control means for coupling the third drive means only to the second drive means during transfer of articles from the transfer conveyor to the second conveyor so that the transfer conveyor moves at the second predetermined speed.

29. An apparatus for positioning and centering an article in a predetermined position on a conveyor, the apparatus comprising a centering ring situated over the conveyor above the predetermined position, supplying means for supplying articles to the centering ring at predetermined time intervals, centering means for centering an article inside the centering ring to position the article in the predetermined position on the conveyor, and moving means for moving the centering ring to a position spaced apart from the conveyor to permit the article centered in the predetermined position on the conveyor to be transported away from the centering apparatus.

30. The apparatus of claim 29, wherein the supplying means includes article delivery means situated above the conveyor for supplying articles to the conveyor and an alignment funnel situated between the delivery means and the conveyor for receiving articles from the delivery means and transporting the articles to the centering ring.

31. The apparatus of claim 30, wherein the supplying means further includes a gate member located inside the alignment funnel to retain an article in the alignment funnel, the gate member moving to an open position after a predetermined time interval to drop the article into the centering ring.

32. The apparatus of claim 29, wherein the centering means includes a reciprocating piston movable from a first position spaced apart from the conveyor to permit articles to enter the centering ring to a second position located in close proximity to the conveyor for engaging the article to center the article inside the centering ring.

33. The apparatus of claim 32, wherein the centering means further includes a piston frame coupled to the piston for suspending the piston over the conveyor above the centering ring and means for providing reciprocating movement of the piston frame relative to the conveyor to move the piston alternately between its first and second positions.

34. The apparatus of claim 29, wherein the centering ring is connected to a frame assembly having a first end pivotably coupled to a frame member and a second end, the moving means including an air cylinder having an actuator arm coupled to the second end of the frame assembly for alternately moving the frame assembly toward and away from the conveyor.

35. An assembly for forming a dough ball against a support surface, the assembly comprising a forming head situated above the support surface, the forming head including a release plate and a forming surface for forming the dough ball against the support surface, means for moving the forming head between a first position spaced apart from the support surface to permit the dough ball to be positioned on the support surfacer below the forming head and a second position in close proximity to the support surface to form the dough ball against the support surface, the moving means including an air cylinder having a reciprocating piston and means for coupling the forming head to the piston, the air cylinder being coupled to a support member for supporting the air cylinder and the forming head above the support surface, said coupling means including a mounting plate interconnecting an end portion of the piston and the forming head and a pin member attached to the mounting plate, the pin member extending through an opening formed in the support member to prevent rotational movement of the forming head relative to a longitudinal axis of the forming head upon reciprocating movement of the piston along the longitudinal axis, and means for extending said release plate away from the forming surface upon the upward movement of the forming head from the second position toward the first position so that the release plate engages the formed dough ball and forces the formed dough ball away from the forming surface to prevent the formed dough ball from sticking to the forming surface.

* * * * *